United States Patent
Williams et al.

(10) Patent No.: US 6,276,846 B1
(45) Date of Patent: Aug. 21, 2001

(54) FILM PLATEN RETRACTED FROM OVER BACKFRAME OPENING IN CAMERA TO UNCOVER FILM SUPPORT DEPLOYED TO GUIDE FILM LEADER

(75) Inventors: Patricia L. Williams, Rochester; Dennis R. Zander, Penfield, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/478,768

(22) Filed: Jan. 6, 2000

(51) Int. Cl.[7] .............................. G03B 1/56; G03B 17/02
(52) U.S. Cl. .................... 396/415; 396/440; 396/536; 396/538
(58) Field of Search .................................. 396/415, 440, 396/411, 387, 536, 538, 535

(56) References Cited

U.S. PATENT DOCUMENTS

| | | | |
|---|---|---|---|
| 3,479,938 | 11/1969 | Winkler et al. | 396/415 |
| 4,482,229 | 11/1984 | Sugiura | 396/415 |
| 4,530,582 | 7/1985 | Hara et al. | 396/440 |
| 4,974,787 | 12/1990 | Arai et al. | 396/387 X |
| 5,546,148 | 8/1996 | Janson, Jr. | 396/440 |
| 5,903,789 | 5/1999 | Zander et al. | 396/411 |
| 5,909,601 | 6/1999 | Zander | 396/415 |
| 5,940,643 | * 8/1999 | Fuss | 396/415 |
| 5,988,894 | * 11/1999 | Zander | 396/415 |

* cited by examiner

Primary Examiner—W. B. Perkey
(74) Attorney, Agent, or Firm—Roger A. Fields

(57) ABSTRACT

A camera comprising a cartridge receiving chamber for a film cartridge with a filmstrip having a protruding film leader, a film door that opens and closes to uncover and re-cover the chamber, a backframe opening for exposing successive sections of the filmstrip, a film platen positioned over the backframe opening to support each section of the filmstrip at the backframe opening, and a film support positioned within the backframe opening to prevent the film leader from becoming jammed in the backframe opening when the film cartridge is placed in the chamber, is characterized in that the film platen is movable to at least partially uncover the backfrane opening in order to provide a film entry zone for the film leader into the backframe opening when the film door is opened, and the film support is coupled with the film platen for movement to the film entry zone to be positioned to prevent the film leader from becoming jammed in the backframe opening when the film platen is moved to partially uncover the backframe opening.

12 Claims, 5 Drawing Sheets

FILM PLATEN RETRACTED FROM OVER BACKFRAME OPENING IN CAMERA TO UNCOVER FILM SUPPORT DEPLOYED TO GUIDE FILM LEADER

FIELD OF THE INVENTION

The invention relates generally to the field of photography, and in particular to cameras. More specifically, the invention relates to a camera having a film platen that is at least partially retracted from over a backframe opening to provide a film entry zone for a film leader into the backframe opening and having a film support that is deployed to the film entry zone to prevent the film leader from becoming jammed in the backframe opening.

BACKGROUND OF THE INVENTION

Commonly assigned U.S. Pat. No. 5,909,601 issued Jun. 1, 1999 discloses a camera comprising a cartridge receiving chamber for a film cartridge with a filmstrip having a protruding film leader, a film take-up chamber, a film door that opens and closes to uncover and re-cover the cartridge receiving chamber, a rearwardly open backframe opening between the cartridge receiving and film take-up chambers for exposing successive sections of the filmstrip, a rear film platen positioned over the backframe opening to support each section of the filmstrip at the backframe opening, a light-trapping film entry slot between the cartridge receiving chamber and the backframe opening, and a film support positioned within the backframe opening proximate the exposed film take-up chamber to prevent the film leader from becoming jammed in the backframe opening when the film cartridge is placed in the cartridge receiving chamber and the protruding film leader is longitudinally advanced through the film entry slot and along the backframe opening to the exposed film take-up chamber. When the film door is opened, it pulls the film platen toward the cartridge receiving chamber without uncovering the backframe opening, and the film platen in turn pivots the film support to a leader supporting position in the backframe opening.

Conversely, when the film door is closed, it pushes the film platen back from the cartridge receiving chamber without uncovering the backframe opening, and the film platen in turn pivots the film support out of the leader supporting position.

SUMMARY OF THE INVENTION

According to one aspect of the invention, a camera comprising a cartridge receiving chamber for a film cartridge with a filmstrip having a protruding film leader, a film door that opens and closes to uncover and re-cover the chamber, a backframe opening for exposing successive sections of the filmstrip, a film platen positioned over the backframe opening to support each section of the filmstrip at the backframe opening, and a film support positioned within the backframe opening to prevent the film leader from becoming jammed in the backframe opening when the film cartridge is placed in the chamber, is characterized in that:

the film platen is movable to at least partially uncover the backframe opening in order to provide a film entry zone for the film leader into the backframe opening when the film door is opened; and the film support is coupled with the film platen for movement to the film entry zone to be positioned to prevent the film leader from becoming jammed in the backframe opening when the film platen is moved to partially uncover the backframe opening.

According to another aspect of the invention, a camera comprising a main body part including a cartridge receiving chamber for a film cartridge with a filmstrip having a protruding film leader and a backframe opening for exposing successive sections of the filmstrip, a film door that opens and closes to uncover and re-cover the chamber, a rear cover part, and a film platen between the backframe opening the rear cover part for supporting each section of the filmstrip at the backframe opening, is characterized in that:

the rear cover part has a rear opening opposite a defined region of the backframe opening which is proximate the chamber; and the film platen is movable to uncover the defined region of the backframe opening in order to permit the defined region to serve as a film entry zone for the film leader into the backframe opening when the film door is opened.

According to another aspect of the invention, a camera comprising a cartridge receiving chamber for a film cartridge with a filmstrip having a protruding film leader, a backframe opening for exposing successive sections of the filmstrip, and a film support movable to a leader supporting position within the backframe opening to prevent the film leader from becoming jammed in the backframe opening when the film cartridge is placed in the chamber and reversible to be retracted from the leader supporting position, is characterized in that:

the film support is a flexible support strip having a pair of ends; and a fixed support is positioned between the ends of the flexible support strip for the flexible support strip to continuously bend about the fixed support as the flexible support strip is moved to the leader supporting position and is reversed.

DETAILED DESCRIPTION OF THE INVENTION

Figure 1:
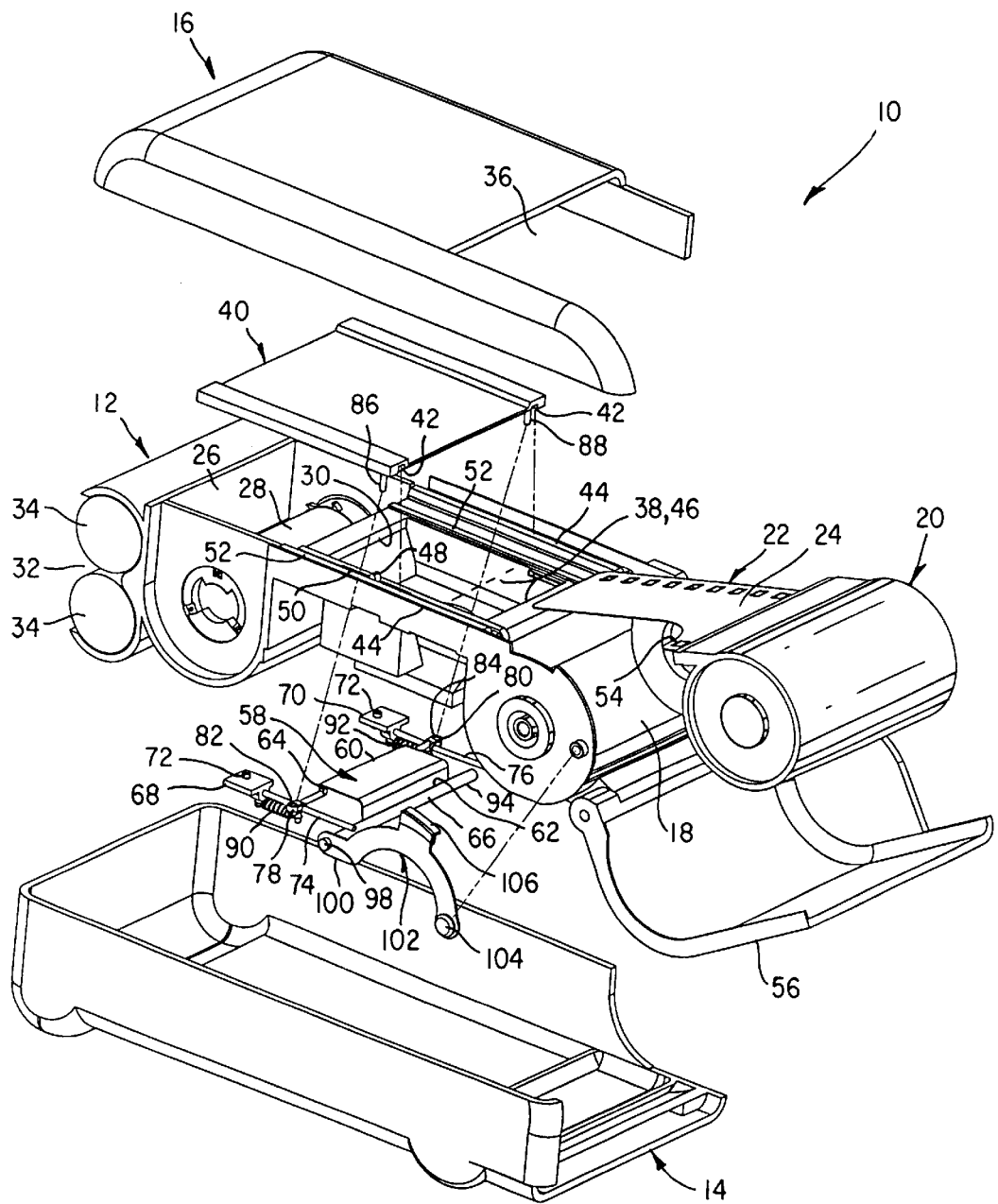
FIG. 1 is an exploded bottom rear perspective view of a camera that is a preferred embodiment of the invention, showing a film door to a cartridge receiving chamber opened.

The invention is disclosed as being embodied preferably in a motorized-film-advance camera. Because the features of a motorized-film advance camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a motorized-film-advance camera 10 comprising an opaque main body part 12, an opaque front cover part 14 and an opaque rear cover part 16. The front and rear cover parts 14 and 16 are connected to one another and/or to the main body part 12 to house the main body part between them.

The main body part 12 includes a rearwardly open cartridge receiving chamber 18 for a conventional film cartridge 20 with a filmstrip 22 having a protruding film leader 24, a rearwardly open film take-up chamber 26 which contains a motor-rotated film take-up spool 28, a rectangular-shaped rear backframe opening 30 between the cartridge receiving and film take-up chambers for exposing successive sections of the filmstrip, and a battery chamber 32 for two batteries 34.

Figure 2:
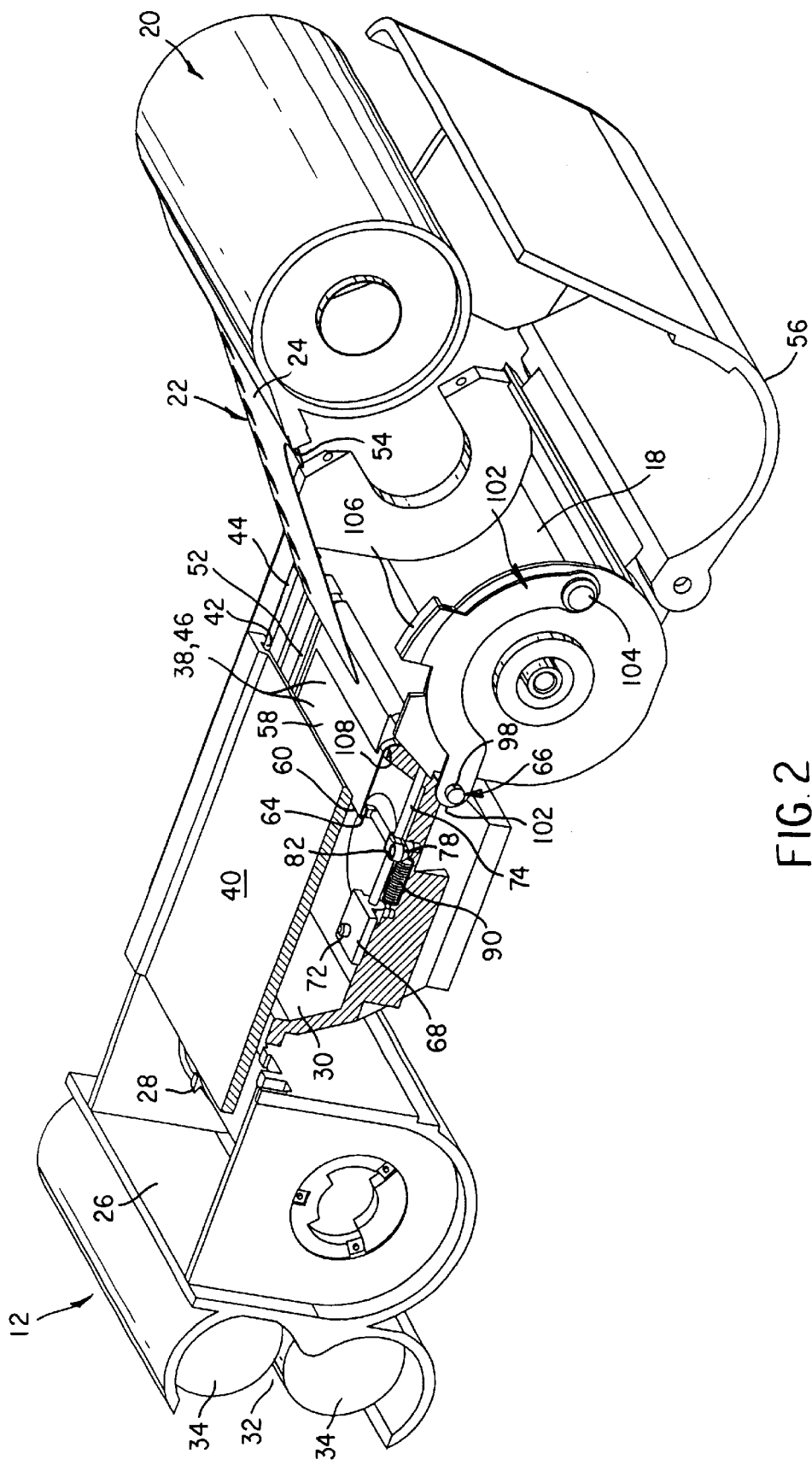
FIG. 2 is a partially assembled, partially sectioned exploded perspective view similar to FIG. 1.
Figure 3:
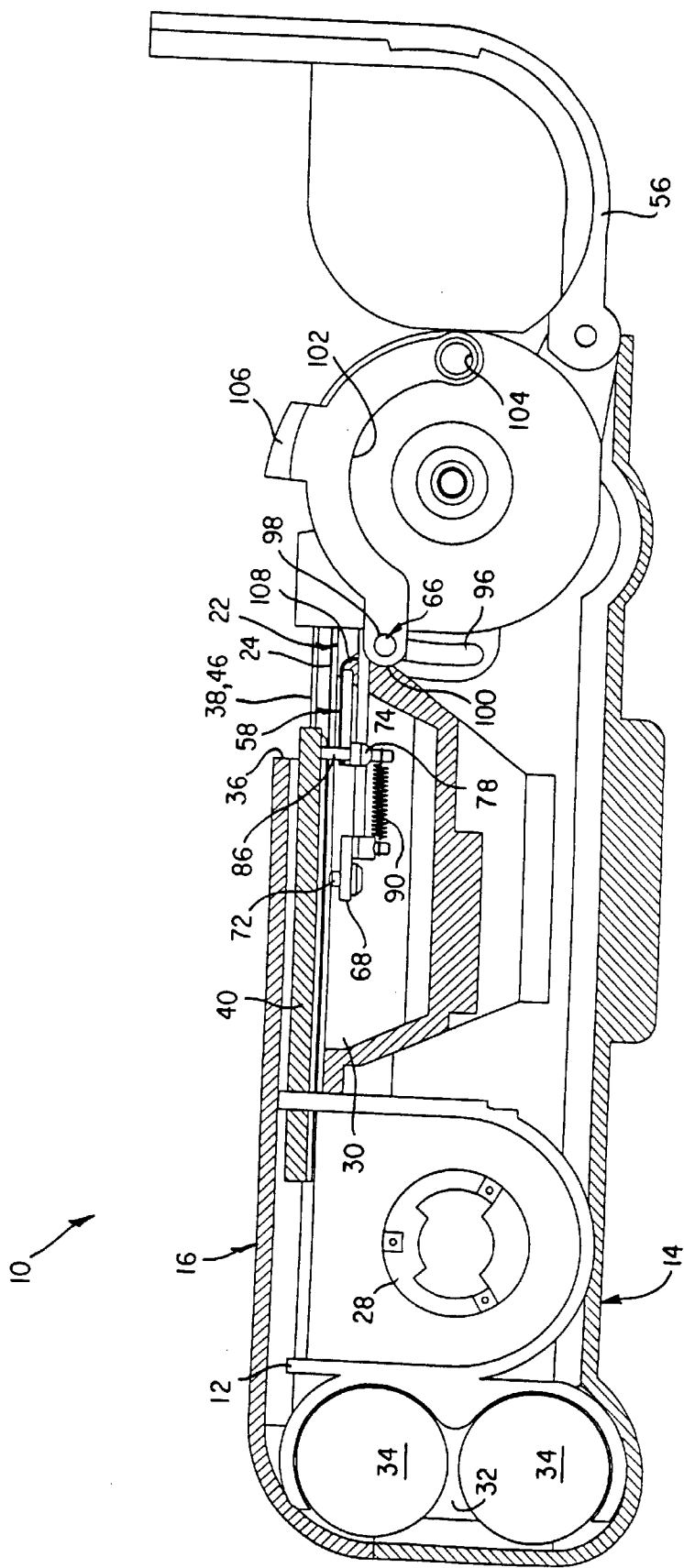
FIG. 3 is a bottom elevation, partially sectioned view of the camera with the film door opened.

The rear cover part 16 has a rear opening or cut-away 36 that is opposite a defined region 38 of the backframe opening 30. As shown in FIGS. 1–3, the defined region 38 of the backframe opening 30 is proximate (nearby) the cartridge receiving chamber 18. That is to say, the defined region 38 of the backframe opening 30 is a right-most (in FIGS. 1–3) region of the backframe opening which is closest to the cartridge receiving chamber 18.

Figure 4:
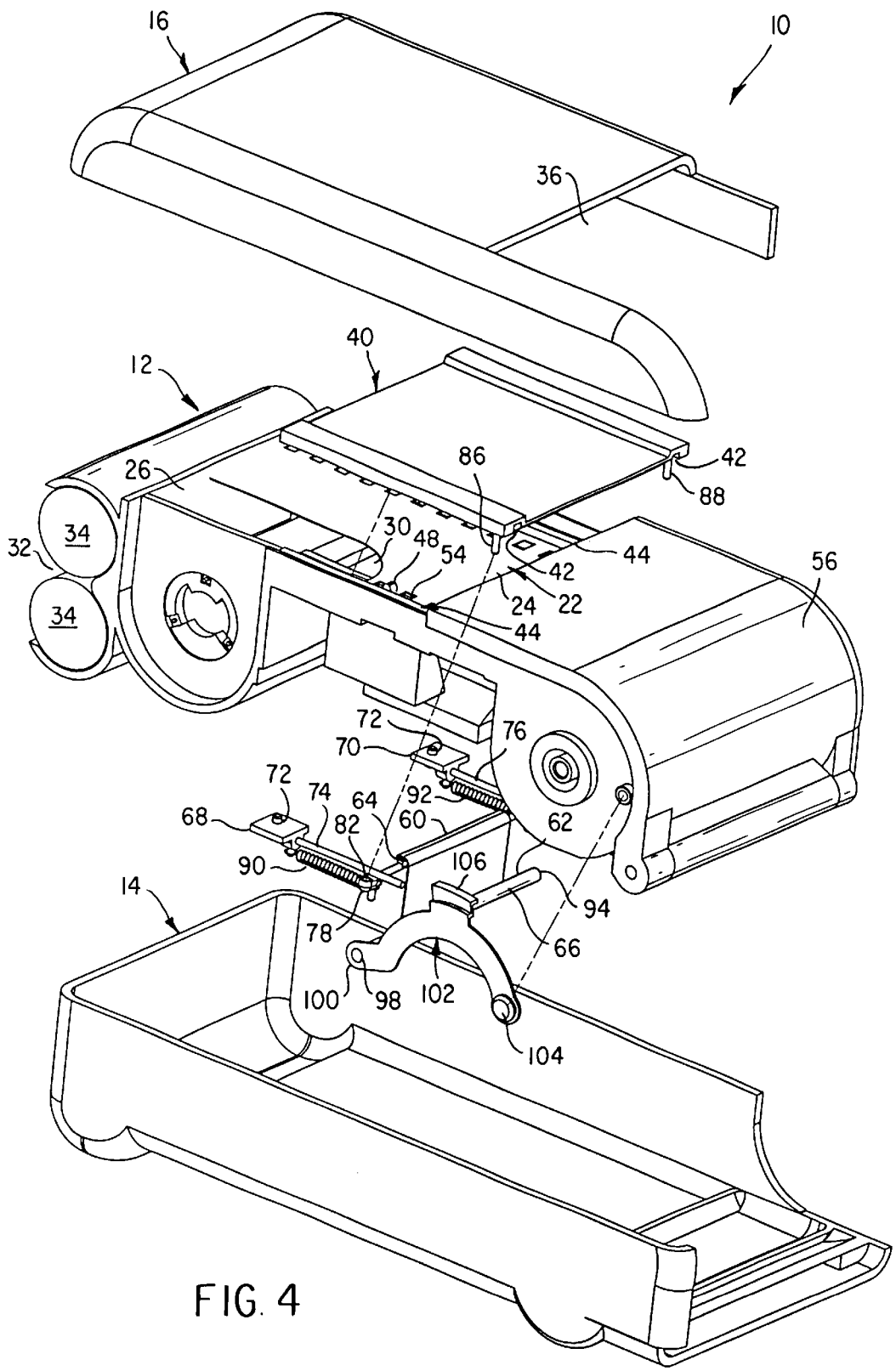
FIG. 4 is an exploded bottom rear perspective view of the camera, showing the film door closed.
Figure 5:
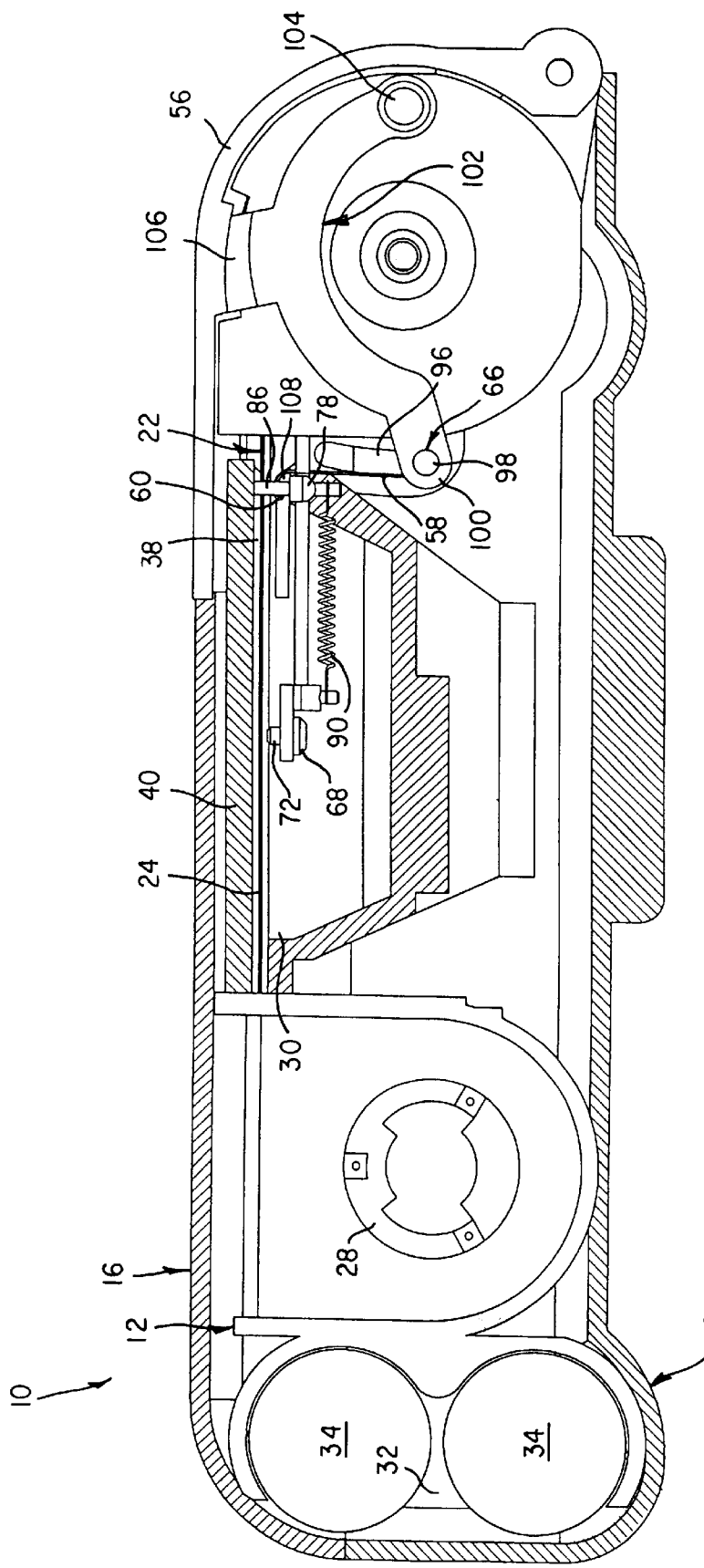
FIG. 5 is a bottom elevation, partially sectioned view of the camera with the film door closed.

A flat film platen 40 is positioned between the backframe opening 30 and the rear cover part 16 to support each section of the filmstrip 22 for exposure at the backframe opening. See FIGS. 1–3. The film platen 40 has a pair of parallel identical slots 42 that receive respective light lock ribs 44 on the main body part 12 to support the film platen for translation back and forth over the backframe opening 30. The film platen 40 can be translated to the left (away from the cartridge receiving chamber 18) as shown in FIGS. 1–3 to uncover the defined region 38 of the backframe opening 30. This permits the defined region 38 to serve as a film entry zone 46 for the film leader 24 into the backframe opening when the film cartridge 20 is received in the cartridge receiving chamber 18. Conversely, the film platen 40 can be translated to the right (towards the cartridge receiving chamber 18) as shown in FIGS. 4 and 5 to re-cover the defined region 38 of the backframe opening 30 in order to prevent the defined region from serving as the film entry zone 46. This, in effect, eliminates (removes) the film entry zone 46.

A known film advance/metering sprocket 48 projects substantially one tooth at a time from a longitudinal opening 50 in one of two parallel film rails 52 on the main body part 12. See FIGS. 1 and 4. The film rails 52 are located inward of the light lock ribs 44 and alongside the backframe opening 30. As is typical, the film advance/metering sprocket 48 engages the filmstrip 22 one tooth at a time at respective edge perforations 54 in the filmstrip. Initially, the sprocket 48 is motor-rotated in engagement with the film leader 24 to advance the film leader along the film rails 52 from the film entry zone 46 to the film take-up spool 28. The film take-up spool 28 is motor-rotated at a faster speed than the metering sprocket 48. When the film leader 24 is engaged with the film take-up spool 28, a known clutch (not shown) discontinues motor rotation of the sprocket 48. The sprocket 48 thereafter is rotated via engagement with the filmstrip 22 at the edge perforations 54.

A film door 56 is pivotally connected with the main body part 12 for opening and closing movements to uncover and re-cover the cartridge receiving chamber 18. When the film door 56 is closed as shown in FIGS. 4 and 5, it occupies the rear opening 26 in the rear cover part 16. When the film door 56 is opened as shown in FIGS. 1–3, it is removed from the rear opening 26 in the rear cover part 16.

A film support intended to be moved to a leader supporting position at the film entry zone 46 as shown in FIGS. 1–3, to prevent the film leader 24 from dropping substantially into the backframe opening 30 and becoming jammed in the backframe opening when the film cartridge 20 is received in the cartridge receiving chamber 18, and which is reversible to be retracted from the leader supporting position as shown in FIGS. 4 and 5, is in the form of a resilient flexible support strip 58. The support strip 58 has opposite ends 60 and 62 secured to respective parallel rods 64 and 66.

A pair of identical fixed brackets 68 and 70 are secured via respective studs 72 to the main body part 12 and include individual parallel cylindrical rails 74 and 76. A pair of end pieces 78 and 80 have respective parallel holes (not shown) through which the cylindrical rails 74 and 76 longitudinally extend to permit the end pieces to be moved back and forth along the rails. The end pieces 78 and 80 are fixed to the rod 64, which is secured to the end 60 of the support strip 58, and have respective holes 82 and 84 that receive individual pins 86 and 88 projecting from the film platen 40. When the support strip 58 is retracted from its leader supporting position as shown in FIGS. 4 and 5, the rod 64 is pulled to the right, in turn pulling the end pieces 78 and 80 which are then moved along the cylindrical rails 74 and 76, and the film platen 40 is likewise moved to the right with the end pieces. Conversely, when the end pieces 78 and 80 are moved to the left along the cylindrical rails 74 and 76 as shown in FIGS. 1–3, the film platen 40 and the support strip 58 are moved to the left. A helical tension spring 90 interconnects the bracket 68 and the end piece 78, and a similar tension spring 92 interconnects the bracket 70 and the end piece 80, to simultaneously urge the end pieces to the left along the cylindrical rails 74 and 76.

The rod 64 has one end 94 in a curved guide slot 96 in the main body part 12 and another end 98 pivotally connected to one end 100 of a control lever 102. Another end 104 of the control lever 102 is pivotally connected to the main body part 12 adjacent the cartridge receiving chamber 18.

OPERATION

When the film door 56 is closed as shown in FIGS. 4 and 5, it pushes against a tab 106 on the control lever 102 to pivot the control lever counter-clockwise about its end 104. Since the end 100 of the control lever 102 is pivotally connected to the end 98 of the rod 66, the rod is moved with that end of the control lever to pull the support strip 58 around a fixed support 108 on the main body part 12 as shown in FIGS. 4 and 5 from its leader supporting position. Consequently, the end pieces 78 and 80 are pulled to the right along the cylindrical rails 74 and 76 as shown in FIGS. 4 and 5, contrary to the urging of the tension springs 90 and 92, and the film platen 40 is likewise moved to the right. The film platen 40 then re-covers the defined region 38 of the backframe opening 30 to, in effect, eliminate the film entry zone 46. As long as the film door 56 remains closed, the control lever 102 is enabled to prevent the tension springs 90 and 92 from moving the end pieces 78 and 80 to the left in FIGS. 4 and 5.

The support strip 58 is constrained at its ends 60 and 62 (because the ends are secured to the rods 64 and 66) to be bent about the fixed support 108. See FIGS. 1,3,4 and 5.

When the film door 56 is opened, it separates from the tab 106 on the control lever 102. This allows the tension springs 90 and 92 to pull the end pieces 78 and 80 to the left along the cylindrical rails 74 and 76 as shown in FIGS. 1–3. Thus, the film platen 40 is moved to the left in FIGS. 1–3 to uncover the defined region 38 of the backframe opening 30, to permit the defined region to serve as the film entry zone 46. The rod 64 is likewise moved to the left to pull the support strip 58 around the fixed support 108 to its leader supporting position at the film entry zone 56, which pivots the control lever 102 clockwise about its end 104 as shown in FIGS. 1–3. As long as the film door 56 remains open, the control lever 102 is disabled to prevent the tension springs 90 and 92 from moving the end pieces 78 and 80 to the left in FIGS. 1–3.

The invention has been described with reference to a preferred embodiment. However, it will be appreciated that variations and modifications can be effected by a person of ordinary skill in the art without departing from the scope of the invention.

PARTS LIST

- 10. camera
- 12. main body part
- 14. front cover part
- 16. rear cover part
- 18. cartridge receiving chamber
- 20. film cartridge
- 22. filmstrip
- 24. protruding film leader
- 26. film take-up chamber
- 28. film take-up spool
- 30. backframe opening
- 32. battery chamber
- 34. batteries
- 36. rear opening
- 38. defined region
- 40. film platen
- 42,42 slots
- 44,44 light lock ribs
- 46. film entry zone
- 48. sprocket
- 50. longitudinal opening
- 52,52 film rails
- 54. edge perforations
- 56. film door
- 58. support strip
- 60. end
- 62. end
- 64. rod
- 66. rod
- 68. bracket
- 70. bracket
- 72,72 studs
- 74. cylindrical rail
- 76. cylindrical rail
- 78. end piece
- 80. end piece
- 82. hole
- 84. hole
- 86. pin
- 88. pin
- 90. spring
- 92. spring
- 94. end
- 96. guide slot
- 98. end
- 100. end
- 102. control lever
- 104. end
- 106. tab
- 108. fixed support

What is claimed is:

1. A camera comprising a cartridge receiving chamber for a film cartridge with a filmstrip having a protruding film leader, a film door that opens and closes to uncover and re-cover said chamber, a backframe opening for exposing successive sections of the filmstrip, a film platen positioned over said backframe opening to support each section of the filmstrip at said backframe opening, and a film support positioned within said backframe opening to prevent the film leader from becoming jammed in said backframe opening when the film cartridge is placed in said chamber, is characterized in that:

said film platen is movable to at least partially uncover said backframe opening in order to provide a film entry zone for the film leader into the backframe opening when said film door is opened; and said film support is coupled with said film platen for movement to said film entry zone to be positioned to prevent the film leader from becoming jammed in said backframe opening when said film platen is moved to partially uncover said backframe opening.

2. A camera as recited in claim 1, wherein said film platen is moved away from said chamber to at least partially uncover said backframe opening in order to provide said film entry zone at a location proximate said chamber.

3. A camera as recited in claim 1, wherein said film platen is movable to re-cover said backframe opening in order to eliminate said film entry zone, and said film support is coupled with said film platen for movement from said film entry zone when said film platen is moved to re-cover said backframe opening.

4. A camera as recited in claim 1, wherein said film support includes a flexible support strip that is constrained to bend about a fixed support for movement to said film entry zone.

5. A camera as recited in claim 1, wherein at least one spring urges said film platen for movement to partially uncover said backframe opening and urges said film support for movement to said film entry zone, and a control device is enabled to prevent said spring from moving said filhn platen and said film support when said film door is closed and is disabled to permit said spring to move said film platen and said film support when said film door is opened.

6. A camera as recited in claim 5, wherein said control device includes a control lever coupled with said film support and which is positioned against said film door when said film door is closed to prevent said spring from moving said film platen and said film support and is free to allow said spring to move said film platen and said film support when said door is opened.

7. A camera comprising a main body part including a cartridge receiving chamber for a film cartridge with a filmstrip having a protruding film leader and a backframe opening for exposing successive sections of the filmstrip, a film door that opens and closes to uncover and re-cover said chamber, a rear cover part, and a film platen between said backframe opening and said rear cover part for supporting each section of the filmstrip at said backframe opening, is characterized in that:

said rear cover part has a rear opening opposite a defined region of said backframe opening which is proximate said chamber; and said film platen is movable to uncover said defined region of the backframe opening in order to permit said defined region to serve as a film entry zone for the film leader into said backframe opening when said film door is opened.

8. A camera as recited in claim 7, wherein said film door occupies said rear opening when said film door is closed and is removed from said rear opening when said film door is opened.

9. A camera as recited in claim 7, wherein said film platen is movable to re-cover said defined region of the backframe opening in order to prevent said defined region from serving as said film entry zone when said film door is closed.

10. A camera as recited in claim 7, wherein said defined region is proximate said chamber, and said film platen is moved away from said chamber to uncover said defined region.

11. A camera comprising a cartridge receiving chamber for a film cartridge with a filmstrip having a protruding film leader, a backframe opening for exposing successive sections of the filmstrip, and a film support movable to a leader supporting position within said backframe opening to prevent the film leader from becoming jammed in said backframe opening when the film cartridge is placed in said chamber and reversible to be retracted from the leader supporting position, is characterized in that:

said film support is a flexible support strip having a pair of ends; and a fixed support is positioned between said ends of the flexible support strip for said flexible support strip to continuously bend about said fixed support as said flexible support strip is moved to the leader supporting position and is reversed.

12. A camera as recited in claim 11, wherein said flexible support strip is constrained at its ends to continuously bend about said fixed support.

* * * * *